United States Patent Office 3,702,834
Patented Nov. 14, 1972

3,702,834
PRODUCTION OF ORGANIC ACIDS
Bertram Yeomans, East Yorkshire, England, assignor to BP Chemicals (U.K.) Limited, London, England
No Drawing. Filed Sept. 8, 1969, Ser. No. 856,204
Claims priority, application Great Britain, Sept. 14, 1968, 43,843/68
Int. Cl. C07c 55/00, 57/00
U.S. Cl. 260—537 R
9 Claims

ABSTRACT OF THE DISCLOSURE

A process in which a neo-acid is reacted with a compound containing one or more isoalkyl groups in the presence of a strong acid, preferably sulphuric acid, to produce a second neo-acid.

---

The present invention relates to the production of neo-acids.

It is known to produce neo-acids by reaction of an olefin and formic acid in the presence of concentrated sulphuric acid or by reaction of an olefin and carbon monoxide in the presence of boron trifluoride. By neo-acid is meant a tertiary carboxylic acid, i.e. one in which the $\alpha$ carbon atom is attached to three other carbon atoms. It has now been discovered that neo-acids can be reacted with compounds having one or more tertiary hydrogen atoms when intermolecular rearrangements will occur.

Accordingly the present invention is a process in which a neo-acid is reacted with a compound containing one or more tertiary hydrogen atoms in the presence of strong acid to produce a second neo-acid.

The compound containing one or more tertiary hydrogen atoms can also be a neo-acid, in which case the products of reaction will be a di-neo-acid and an iso-paraffin. Thus the invention provides a useful method for producing di-neo-acids. Alternatively the compound containing the tertiary hydrogen atoms may be an isoparaffin, in which case the product of reaction will be a second iso-paraffin and a second neo-acid containing the carbon skeleton of the original isoparaffin. Thus the invention provides a method for producing neo-acids which may not be readily prepared by the methods mentioned earlier, from neo-acids which are readily prepared.

Formic acid will suppress the rearrangement reaction. Thus if the neo-acid is made by a route which involves formic acid, the formic acid must be removed before the neo-acid is used.

The neo-acid preferably contains from 5 to 20 carbon atoms. The number of carbon atoms in the compound containing a tertiary hydrogen atom depends on the exact structure of the compound, but compounds containing from 8 to 20 carbon atoms are preferred.

The molar ratio of neo-acid to compound containing tertiary hydrogen atoms is not very critical and ratios in the range 0.1 to 10.0 moles of acid per mole of compound containing tertiary hydrogen may be used. It is preferred to use an excess of the compound containing tertiary hydrogen.

The invention is particularly useful for the production of di-neo-acids, either by reaction of two mono-neo-acids which contain tertiary hydrogen atoms or by reaction of a mono-neo-acid with a di-isoparaffin. When the di-neo-acid is produced from a mono-acid, the mono-neo-acid must have a tertiary hydrogen atom attached to a carbon atom separated from the $\alpha$ carbon atoms of the acid by at least two, preferably at least four carbon atoms. Preferably the mono-acid contains from 9 to 20 carbon atoms. The di-neo-acid may be produced from a single mono-neo-acid or a mixture of mono-neo-acids in which one of the mono-neo-acids has the structure described above.

When the di-neo-acid is prepared by reaction of a mono-neo- acid and an isoparaffin the isoparaffin should be a di-isoparaffin which the tertiary hydrogen atoms are attached to carbon atoms which are separated by at least two, preferably at least four carbon atoms. The di-isoparaffin preferably contains 8 to 19 carbon atoms. The mono-neo-acid used should not contain any tertiary hydrogen atoms attached to a carbon atom which is separated by 2 or more carbon atoms from the $\alpha$ carbon atom of the acid. If it does, reaction between two molecules of mono-neo-acid will occur much more quickly than reaction between mono-neo-acid and di-isoparaffin, and the di-isoparaffin will remain unchanged.

Whenever it is desired to react a mono-neo-acid with a compound containing a tertiary hydrogen atom which is not a neo-acid, the mono-acid should not contain a tertiary hydrogen atom attached to a carbon atom separated by two or more carbon atoms from the $\alpha$ carbon atoms. If it does the neo-acid will react more quickly with itself than the other compound.

The reaction is carried out in the presence of strong acid. The acid may be a Bronsted acid preferably with a pK value greater than 2 such as hydrofluoric, perchloric, chlorosulphonic, fluorosulphonic or sulphuric acid. Nitric acid should not be used as oxidation reaction may occur rather than the desired rearrangement. Lewis acids may also be used. Preferred Lewis acids are pentafluoro antimonate in admixture with hydrogen fluoride, boron trifluoride and phosphoric acid or boron trifluoride and hydrofluoric acid.

The preferred acid is sulphuric acid whose concentration is not less than 90% w./w., preferably not less than 97% w./w. Not less than 1 mole of sulphuric acid should be used per mole of neo-acid. The preferred amount is 5 to 10 moles of sulphuric acid per mole of neo-acid. With mixtures which react only slowly it may be preferred to use up to 20 moles of sulphuric acid, and it is believed that up to 40 moles is adequate in all cases.

The reaction temperature should not be greater than 80° C. as oxidative side reactions may occur, and preferably not greater than 60° C. It is particularly preferred to operate at ambient temperature, below 40° C.

The reaction time required is a function of the skeletal structure of the reagents, the reaction temperature and the catalyst used, but it should exceed one second. Reaction times of the order of one hour and more may conveniently be used.

The compound produced by the invention may find use for example in the manufacture of esters, plasticisers and polymers.

EXAMPLE 1

45.42 g. of 97% w./w. deuterium sulphate was added under stirring at 23° C. to 8.8 g. of neo-undecanoic acids which contained 74.5% w./w. of 2:2:7-trimethyl octanoic acid. Samples were withdrawn from the stirred mixture at selected intervals, quenched in 4 volumes of water and the precipitated 2:2:7:7-tetramethyl suberic acid (M.P. 180°–4° C.) was washed with water and cyclohexane, dried and assayed. The results of this experiment are given in Table 1.

TABLE 1

| Sa number | Sample size (ml.) | Duration (h.) | Temp. (° C.) | Dried TMS-acid (g.) | Percent conversion of 2:2:7-trimethyl octanoic acid to TMS-acid [1] |
|---|---|---|---|---|---|
| 1 | 5 | 1 | 23 | 0.154 | 25.6 |
| 2 | 5 | 3 | 22 | 0.226 | 37.7 |
| 3 | 5 | 6 | 23 | 0.302 | 50.4 |
| 4 | 18 | 24 | 21 | 1.2718 | 58.9 |

[1] Based on 2:2:7-trimethyl octanoic acid used.

EXAMPLE 2

49 g. of 99% w./w. sulphuric acid was added at 22° C. to 9.3 g. of neo-undecanoic acids which contained 83% w./w. of 2:5-dimethyl-2-ethyl heptanoic acid. Samples were withdrawn from the stirred mixture at selected intervals and the 2:2:7:7-tetramethyl suberic acid (M.P. 187°–7.5° C.) was isolated as described in Example 1. The results are given in Table 2.

TABLE 2

| Sa number | Sample size (ml.) | Duration (h.) | Temp. (° C.) | Dried di-neo-acid (g.) | Percent conversion of mono-neo-acid to di-neo-acid [1] |
|---|---|---|---|---|---|
| 1 | 5 | 24 | 22 | 0.006 | 0.8 |
| 2 | 5 | 120 | 20 | 0.207 | 31.4 |
| 3 | 5 | 168 | 20 | 0.243 | 36.6 |

[1] Based on 2:5-dimethyl-2-ethyl heptanoic acid used.

EXAMPLE 3

Productions of di-neo-acids from polyisomeric mixtures of mono-neo-acids

The neo-acid was added to the sulphuric acid catalyst at ambient temperature under stirring. Stirring was maintained for ca. 6 h. and then the mixture was allowed to stand for several days before dilution with an equal weight of water. The regenerated neo-acids were partitioned with cyclohexane (3 volumes), separated from solvent and isoparaffins by extraction with excess aqueous sodium hydroxide solution and regenerated again with excess hydrochloric acid. The regenerated neo-acids liquid phase was separated, water washed and dried. Increase in acidity of the neo-acid product was a measure of the di-neo-acid content. The results are given in Table 3.

EXAMPLE 5

Reaction of an aliphatic mono-neo-acid which contains an isoalkyl group with an isoparaffin which contains two isoalkyl groups 2:2:3-trimethyl butyric acid (6.5 g.) and 2:7-dimethyl octane (7.1 g.) was mixed with 99% w./w. $H_2SO_4$ (49 g.) at ca. 20° and was then allowed to stand for 27 days. The mixture was poured into four volumes of water and the precipitated 2:2:7:7-tetramethyl suberic acid (0.150 g.) was separated by filtration. The regenerated neo-acids (5.18 g.) were separated from the catalyst raffinate and found to contain a small amount of 2:2:7-trimethyl octanoic acid. This experiment demonstrated that one or both tertiary hydrogens present in the 2:7-dimethyl octane may be replaced by carboxyl groups.

EXAMPLE 6

Reaction of an aliphatic mono-neo-acid which does not contain an isoalkyl group with an isoparaffin which contains two isoalkyl groups 2:2-dimethyl pentanoic acid (3.045 g.) and 2:7-dimethyl octane (7.1 g.) were mixed with 99% w./w. $H_2SO_4$ (49 g.) at ca. 20° C. and then allowed to stand for 11 days. The reaction mixture, processed by the procedure described in Example 5, yielded 2:2:7:7-tetramethyl suberic acid (0.307 g.) and a small amount of 2:2:7-trimethyl octanoic acid.

EXAMPLE 7

The effect of variation of catalyst/neo-acid molar ratio and reaction temperature These experiments were carried out by the procedure given in Example 5 and the results are given below.

TABLE 3

| Run number | Mono-neo-acid used | Reagents, molar ratio | | Reaction | | Percent w./w. acid assay of product | | Extrapolated, percent content of di-neo-acids in product |
|---|---|---|---|---|---|---|---|---|
| | | Neo-acids | $H_2SO_4$ | Temp., degrees | Duration (d.) | Initial | Final | |
| 1 | $C_{13}$ acids ex propylene tetramer | 1 | 20 | ca. 22 | 7 | 99.2 | 140.3 | 73 |
| 2 | do [1] | 1 | 19.7 | ca. 22 | 7 | 99.8 | 146.2 | 80 |
| 3 | $C_{13}$ acids ex butene trimer | 1 | 20 | ca. 22 | 9 | 100 | 117.5 | 37 |
| 4 | $C_{10}$ acids ex propylene trimer [2] | 1 | 10 | ca. 22 | 7 | 100 | 103.3 | [3] 12 |

[1] This experiment was carried out on 0.85 mole scale based on neo-acids used and the remainder with 25 or 50 mm. of neo-acids.
[2] This neo-acid was commercially produced by Enjay U.S.A.
[3] Includes 2% yield of 2:2:6:6-tetramethyl pimelic acid (M.P. 167°–168.5° C).

EXAMPLE 4

Reaction of an aliphatic mono-neo-acid with more than one isoalkyl group in the chain Neo-tridecanoic acid (5.35 g.; mainly 2:6-dimethyl-2-isobutyl heptanoic acid) was mixed with 99% w./w. $H_2SO_4$ (49 g.) at ambient temperature and then stood for 18 days. The neo-acids product, separated from neutral substances by the procedure described in Example 3, had an increased acid assay (6.5% w./w. increase based on m. wt. 214) which corresponded to ca. 16% w./w. content of $C_{14}$ di-neo-acids.

| Run number | Reagents, molar ratio | | Reaction temp., (° C.) | Time for half reaction (d.) |
|---|---|---|---|---|
| | 2-ethyl-2:5-dimethyl heptanoic acid | $H_2SO_4$ | | |
| 1 | 1 | 20 | 20 | 1 |
| 2 | 1 | 10 | 20 | 12 |
| 3 | 1 | 10 | [1] 50 | 0.75 |

[1] When the reaction temperature was increased to 70° C. oxidation side reactions predominated and the yield of di-neo-acids aere depressed.

EXAMPLE 8

The effect of mono-neo-acid conformation on rate of rearrangement to di-neo-acid

| Run No. | Molar ratio used | | Mono-neo-acid used | Carbon separation between groups | Time for half reaction (days) |
|---|---|---|---|---|---|
| | $H_2SO_4$ | Neo-acid | | | |
| 1 | 10 | 1 | 2.2.7-trimethyl octanoic acid | 4 | 0.04 |
| 2 | 20 | 1 | 2.2.6-trimethyl heptanoic acid | 3 | 1 |
| 3 | 20 | 1 | 2.2.5-trimethyl hexanoic acid | 2 | 6 |
| 4 | 40 | 1 | 2.2.4-trimethyl pentanoic acid | 1 | ([1]) |
| 5 | 10 | 1 | 2-2.3-trimethyl butyric acid | 0 | ([2]) |

[1] No reaction after 43 days.
[2] No reaction after 35 days.

EXAMPLE 9

Production of a di-neo-acid with a Lewis acid catalyst 2.2.7-trimethyl octanoic acid (2.96 g., 0.016 m.) and a 1:1:0.75 molar mixture of $BF_3:H_3PO_4:H_2O$ (58 g.) were mixed and allowed to stand at ca. 20° C. for 10 days. The reaction mixture was then treated with an equal volume of water and cyclohexane and the precipitated 2.2.7.7-tetramethyl suberic acid (M.P. 185° C., wt. 0.0074 g.=04% yield) was isolated by filtration

EXAMPLE 10

2.2.4.4-tetramethyl valeric acid (7.9 g., 0.05 m.) 2.7-dimethyl octane (7.1 g, 005 m) and 99% $H_2SO_4$ (49 g., 0.5 m.) were mixed together and then allowed to stand at ca 20° C. for 35 days. The reaction product was then treated with 4 volumes of water and the precipitated 2.2.7.7-tetramethyl suberic acid (M.P. 186° C., wt. 0.065 g.=0.00027 m.=1% yield) was isolated by filtration.

EXAMPLE 11

1-carboxy-1.2-diiosobutyl cyclohexane (3 g., 12.5 mm.) and 99% $H_2SO_4$ (24.5 g., 0.25 m.) were mixed and stood for 3 days at ambient temperatures. The reaction mixture was then treated with 4 volumes of water and the organic phase separated by partition with cyclohexane (2× 10 ml.). The neo-acid products were chemically separated from neutral reaction products. The isolated neo-acid product (1.33 g.) contained 55% of a di-acid of the same g-l/c elution time as 2.2.11.11-tetramethyl dodecandioic acid and this result was confirmed by acid assay.

one day. The reaction product yielded a solid di-neo-acid (M.P. 114°–175° C., 36% yield) and this consisted of 2-ethyl-2.7.7-trimethylsuberic acid and 2.2.8.8-tetramethyl-azelaic acid.

EXAMPLE 14

Rearrangement of mono-neo-acid other than α,α-dimethylalkanoic acids

A mixture (25 mmol of 2-methyl-2-butyloctanoic and 2-ethyl-2-propyloctanoic acids was mixed with 99% w./w. sulphuric acid (500 mmol) at 20° C. for 7 days. A 41% conversion of the mixture of mono-neo-acids to di-neo-acids was obtained. The purified di-neo-acid (M.P. 115° C.) was shown to be 2.2.9.9-tetramethylsebacic acid.

I claim:

1. A process for the production of di-neo-acids, comprising contacting at a temperature of not more than about 80° C. a mono-neo-acid as the only reactant with a strong acid selected from the group consisting of 90–100% wt./wt. sulphuric acid and Lewis acids to produce a di-neo-acid, said mono-neo-acid containing 9 to 20 carbon atoms and having a tertiary hydrogen atom attached to the carbon atom separated by at least two carbon atoms from the α-carbon atom thereof.

2. A process according to claim 1 in which the strong acid is 90–100% wt./wt. sulphuric acid and between 1 and 40 moles of said 90–100% wt./wt. sulphuric acid are used per mole of mono-neo-acid.

3. A process according to claim 1 in which the tertiary hydrogen atom is attached to a carbon atom separated

EXAMPLE 12
The effect of conformation of alicylic mono-neo-acid on the yield of di-neo-acid

| Run No. | Molar ratio used | | Duration (d.) | Mono-neo acid used | Percent yield of di-neo-acids |
|---|---|---|---|---|---|
| | $H_2SO_4$ | Neo-acid | | | |
| 1 | 21 | 1 | 19 | (2.2.2) and (3.2.1)-bicyclo octane-1-carboxylate | 0 |
| 2 | 20 | 1 | 3 | 1-carboxy-1.2-diisobutyl-cyclohexane | [1] 41 |
| 3 | 20 | 1 | 2 | 1-carboxy-2.2-dimethyl-(4.3.1) and (4.2.2) bicyclodecane. | [2] 6 |

[1] A neutral product, identified as a mixture of 1.2-diisobutylcyclohexane and 1.4-diisopropylcyclooctane, was obtained from this reaction.
[2] A solid di-neo-acid (M.P. 179.5°–181.5° C.) was isolated from this reaction which was apparently 1-carboxy-1(4′ carboxy-4′methyl pentyl) cyclohexane (Mixed M.P. and infra-red spectroscopic analysis).

EXAMPLE 13

Preparation of di-neo-acids other than the α,α,α′,α′-tetramethylalkandioic acids 6-ethyl-2.2-dimethyloctanoic acid (5 mmol) was mixed with 99% w./w. sulphuric acid (100 mmol) at 20° C. for by at least four carbon atoms from the α-carbon atom of the mono-neo-acid.

4. A process for the production of a di-neo-acid which comprises contacting an open-chain mono-neo-acid containing 9 to 20 carbon atoms and having a tertiary hydrogen atom attached to a carbon atom separated from the α-carbon atom thereof by at least two carbon atoms as the only reactant with 90–100% wt./wt. sulphuric acid at a temperature of not more than 60° C. and a reaction time of at least 1 second.

5. The process according to claim 1, wherein the strong acid is 90–100% wt./wt. sulphuric acid.

6. The process according to claim 1, wherein the strong acid is a Lewis acid.

7. The process according to claim 6, wherein the Lewis acid is pentafluoro antimonate in admixture with hydrogen fluoride, boron trifluoride and phosphoric acid, or boron trifluoride and hydrofluoric acid.

8. The process according to claim 4, wherein the tertiary hydrogen atom is attached to a carbon atom separated by at least four carbon atoms from the $\alpha$-carbon atom of the mono-neo-acid.

9. The process according to claim 4, wherein between 1 and 40 moles of said 90–100% wt./wt. sulphuric acid are used per mole of mono-neo-acid.

References Cited

UNITED STATES PATENTS 3,515,737　6/1970　Yeomans _____ 260—413

FOREIGN PATENTS 913,041　12/1962　Great Britain _____ 260—533

OTHER REFERENCES

Hine, Physical Organic Chemistry, 2nd ed., pp. 311–312 (1962).

Meinwald et al., J.A.C.S. 82, 483 (1960).

LORRAINE A. WEINBERGER, Primary Examiner

R. GERSTL, Assistant Examiner

U.S. Cl. X.R.

260—514 R, 533 R